United States Patent Office 3,456,256
Patented July 15, 1969

3,456,256
ASYNCHRONOUS COLLISION AVOIDANCE SYSTEM
Robert E. Perkinson, St. Louis, and Martin J. Borrok, Berkeley, Mo., assignors to McDonnell Douglas Corporation, St. Louis, Mo., a corporation of Maryland
Filed June 21, 1967, Ser. No. 647,861
Int. Cl. G01s 9/56
U.S. Cl. 343—6.5
12 Claims

ABSTRACT OF THE DISCLOSURE

An asynchronous collision avoidance system including transmitters for sending and receivers for receiving signals between relatively moving objects such as between in-flight aircraft, said signals being coded as to altitude, the receiver for receiving similarly coded signals from other cooperating aircraft including a discriminator in each aircraft for evaluating the signals it receives to determine relative movement between the sending and receiving craft and whether the craft are flying at or near the same altitude, and threat evaluator and interrogator control in each craft for establishing criteria from which it can be determined whether a reply signal should be sent back from which range and/or time to nearest approach can be determined and, if necessary, an appropriate warning given in time to execute an evasive maneuver.

---

Figure 1:
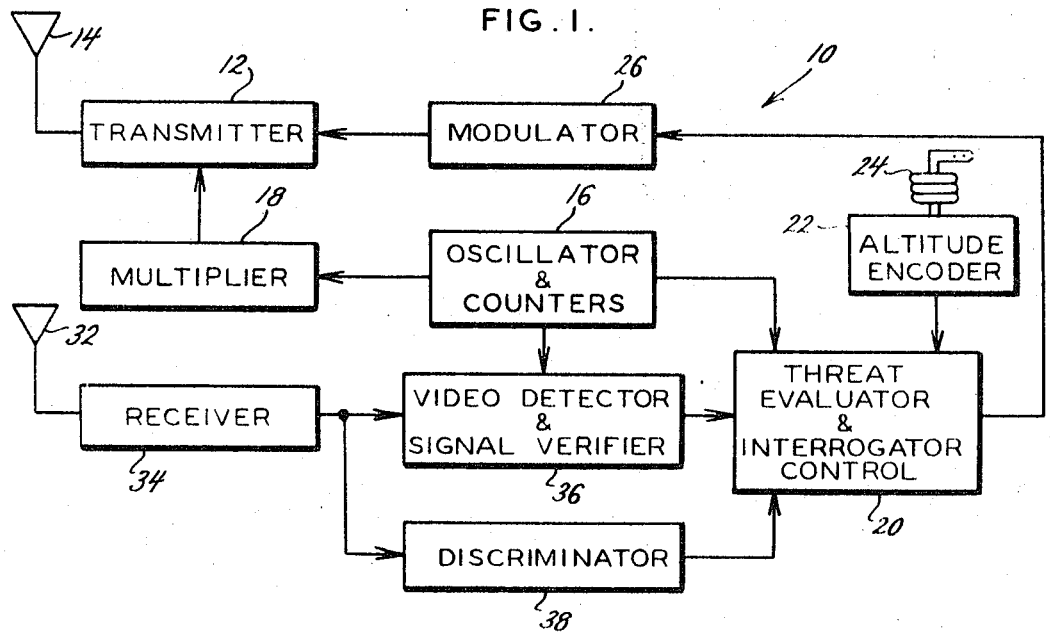

The present invention relates generally to collision avoidance systems and the like, and more particularly to a collision avoidance system for preventing collisions between aircraft and other relatively moving objects. With the advent of high speed aircraft and with the large numbers of aircraft constantly in the air for commercial, military and other purposes the problems of providing effective means to prevent collisions and to make the airways safe has become urgent. Most known collision avoidance systems are relatively complicated and sophisticated and for the most part are too expensive for general wide spread use particularly on private relatively inexpensive aircraft. Furthermore, the larger, more sophisticated systems which are finding increasing acceptance rely on maintaining a condition of precise time synchronism between all cooperating units and such systems are not immune from malfunction and failure, and it is therefore desirable to provide a backup or standby system that can take over in emergencies, if this can be provided inexpensively. The present invention teaches the construction and operation of a relatively inexpensive, unsophisticated collision avoidance system which within limits is accurate and reliable and is capable of providing timely warnings of threatening conditions. The subject system therefore overcomes many of the disadvantages and limitations of existing collision avoidance systems, and also provides means for substantially expanding the availability of collision avoidance protection particularly to owners and users of relatively small aircraft.

It is a principal object of the present invention to provide relatively inexpensive collision avoidance means for aircraft and other relatively movable objects.

Another object is to increase the number of aircraft equipped with collision avoidance protection.

Another object is to provide relatively accurate and reliable means for evaluating the thread of possible collision between relatively movable objects.

Another object is to provide collision avoidance protection which does not depend upon cooperating units being synchronized.

Another object is to provide a cooperative collision avoidance system in which all cooperating units operate on the same frequency Another object is to provide an interrogate-respond type collision avoidance system which includes means that define the conditions that represent potential threats and means for comparing existing conditions based on information received from other cooperating units in the system to determine if a dangerous condition exists.

Another object is to provide means for advancing the time of transmission of a signal proportional to the closing rate between relatively movable objects so that the signal when received becomes an estimate of the predicted range between the objects at some future time.

Another object is to provide a relatively simple unsophisticated system indicating threatening conditions between two or more relative moving objects.

Another object is to teach the construction and operation of a collision avoidance system which includes means for determining range, range rate and altitude of cooperating aircraft.

Another object is to provide relatively inexpensive back-up protection for more sophisticated collision avoidance systems.

Another object is to provide asynchronous collision avoidance means which are compatible with synchronized systems.

Figure 2:
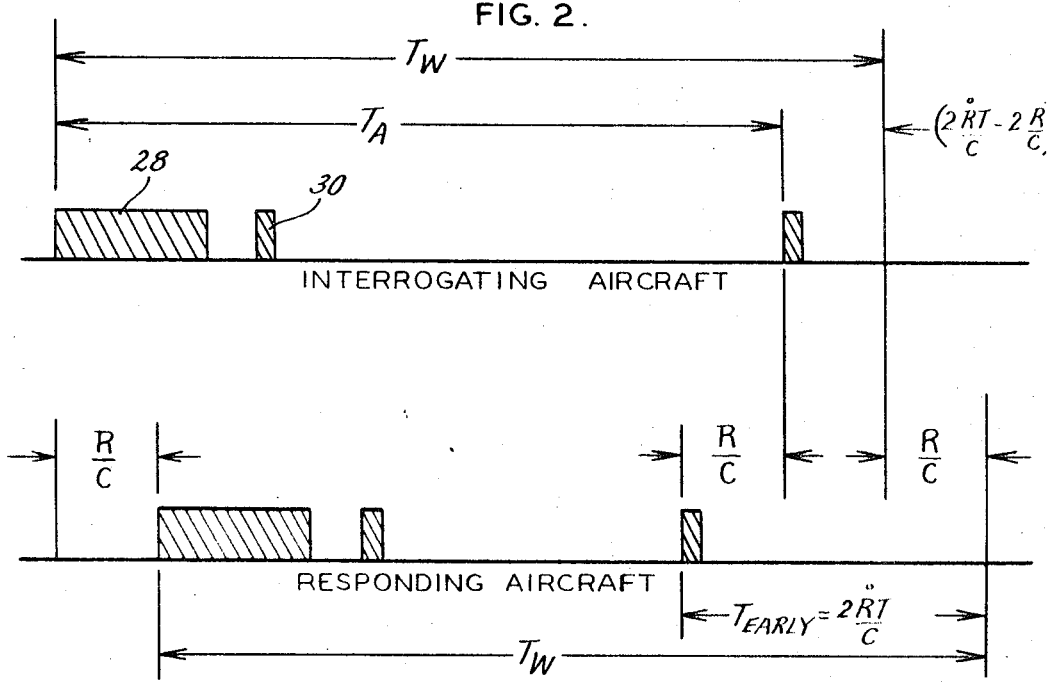

These and other objects and advantages of the present invention will become apparent after considering the following detailed specification which covers a preferred embodiment thereof in conjunction with the accompanying drawing, wherein:

FIG. 1 is a block diagram of a circuit for an asynchronous anti-collision system constructed according to the present invention; and, FIG. 2 is a sequence chart showing the times of transmission and receipt of signals between cooperating aircraft equipped with the system of FIG. 1.

Referring to the drawing more particularly by reference numbers, number 10 refers generally to a circuit for one unit of a collision avoidance system constructed according to the present invention. A circuit similar to the circuit 10 will be installed in each cooperating aircraft and all aircraft will periodically randomly transmit and receive coded collision avoidance signals on the same frequency. The circuit 10 is shown in block form for simplicity and the various blocks may contain circuits and circuit elements of known constructions. The invention resides in the entire system and its operating characteristics and not in any individual component of the system.

The subject system is designed and constructed to be operated asynchronously, that is the various units installed in cooperating aircraft need not be synchronized to each other as required in existing systems such as the systems disclosed in Perkinson et al. Patent No. 3,250,896, and in copending Perkinson et al. application Ser. No. 409,697, now Patent No. 3,341,812, both of which are assigned to applicants' assignee. The present asynchronous system is also a less sophisticate, less complicated and less expensive system than the synchronized systems and preferably is constructed and operated to be compatible therewith. The present system can also be as an emergency or backup for the more complex systems, and it can be used to expand the number of aircraft equipped with some form of collision avoidance protection.

The subject system is made up of a plurality of similar cooperating units each periodically transmitting coded interrogation signals. These signals are received by other cooperating units within range, and each receiving unit evaluates the signals it receives in order to determine whether to send a reply. Evaluation of interrogation signals is performed in two stages as to altitude and range. Each interrogation signal transmitted is coded to indicate the altitude at the transmitting aircraft, and each receiving unit decodes the altitude in each signal it receives and compares the altitude thus decoded with its own altitude to determine if the interrogating aircraft is flying at or near the same altitude as the receiving aircraft. Before a reply signal can be transmitted it must be determined that the sending and receiving aircraft are at or near the same altitude.

Each receiving aircraft also includes means for accurately measuring the frequency of each signal it receives in order to determine if there is any frequency shift, sometimes called Doppler shift. The amount and direction of shift is used to determine if the sending and receiving aircraft are moving closer together or further apart, or are staying approximately the same distance from each other. If a coaltitude condition is determined, and if it is also determined that the aircraft are moving closer together, the circuit at the receiving aircraft will be energized to transmit a reply signal back to the interrogating aircraft from which the interrogating aircraft can determine if there will be a future safe range separation between the two aircraft and, if necessary, produce a suitable cockpit warning. Aircraft which are closing on each other, that is, moving closer together, will transmit their reply signals at accurately determined times relative to the interrogating signals as will be explained. For example, aircraft which meet certain predetermined conditions including moving closer together will transmit their reply signals earlier than a predetermined time following receipt of an interrogating signal. In the case of commercial aircraft these replies will be transmitted early by an amount of time approximately equal to a forty second extrapolation of range closure divided by the propagation velocity constant (the velocity of light). In other words each responding aircraft will transmit a reply that is advanced in time relative to some preestablished zero Doppler shift time by an amount of time proportional to the closing rate. This means that the reply arriving back at the interrogating aircraft becomes an estimate of the predicted range between the aircraft at some future time. This future range prediction is used as the basis for determining if a threatening condition exists. For example, a threat would be indicated when the reply signal arrives at a time indicating that in forty seconds less than one mile separation will exist between the craft. This one mile is approximately equal to twelve microseconds as measured after the delay time $T_w$ as will be explained. If the aircraft are not closing but instead are staying approximately the same distance apart as indicated by a zero Doppler shift condition, the reply signal will be transmitted exactly at the said predetermined time measured from the leading edge of the interrogation signal. If the aircraft involved are moving away from each other no reply signal will be transmitted.

Referring to FIG. 1, the circuit 10 includes a transmitter portion 12 connected to a transmitting antenna 14 and energized by signals generated in an oscillator-counter circuit 16, the output of which is multiplied in multiplier circuit 18. The output of the multiplier circuit 18 is a stable radio frequency signal which is fed to the transmitter circuit 12 for transmitting to the other cooperating units.

The oscillator-counter circuit 16 also produces other outputs, one of which is fed to a threat evaluator and interrogator control circuit 20, which circuit receives other signals from altitude encoder means 22 under control of pressure responsive means 24. The altitude encoded outputs of the circuit 22 are used to encode the interrogate signals transmitted from the aircraft. Thus the combination of the circuits 16, 20 and 22 periodically produce video output signals which contain altitude information. The outputs of the circuit 20 are also applied to a modulator circuit 26 which controls or modulates the RF output signals transmitted by the transmitter circuit 12.

Referring to FIG. 2, the horizontal time line labeled Interrogating Aircraft is shown having a block 28 which represents a signal envelope corresponding to the transmission of one interrogation signal from the transmitter 12. The signal represented by the block 28 has a particular system frequency and a fixed time duration such as 200 microseconds which is an arbitrary time that is long enough for the receiving aircraft to use it to accurately determine its frequency for Droppler measurement purposes.

Another signal block 30 position coded for altitude purposes occurs sometime after the end of the block 28 such that the distance between the signal blocks 28 and 30 is proportional to the altitude of the interrogating or transmitting aircraft. The signal blocks 28 and 30 are transmitted at the same frequency, and the duration and locations of the blocks 28 and 30 are controlled by the modulator circuit 26 which in turn is controlled by the circuits 16, 20 and 22. It is important that each interrogation signal that is transmitted be produced by information and control means that are entirely within the interrogating aircraft so that no outside information is required for such transmissions. Furthermore, the interrogation signals can be transmitted at any time and on any desired schedule and do not depend on information received from other places. This means that each cooperating aircraft is independent of others in developing and transmitting interrogation signals which contain information from which other aircraft can make an initial evaluation to determine whether to send a reply.

Each cooperating aircraft receiving an interrogating signal is provided with a circuit similar to the circuit 10, which circuits also include in addition to the components already described, a receiving antenna 32 and a receiver circuit 34. Each receiver is tuned to the system frequency and each receiving circuit includes means to determine the altitude at the interrogating aircraft and the range rate using Doppler. The receiver 34 also includes means for producing outputs which are fed to video detector and signal verifier circuit 36 and to discriminator circuit 38.

The circuit 36 produces two output signals in response to receipt of each interrogating signal, one of which occurs at a fixed time relative to the time of receipt of the interrogating signal, and the other is a signal proportional to the altitude information decoded from the received interrogating signal. At the same time, the discriminator circuit 38 responds to the frequency of each signal it receives and produces an output proportional to the Doppler frequency shift that is detected. These Doppler signals are fed from the discriminator circuit 38 to the threat evaluator and interrogator control circuit 20 for further evaluation. If the Doppler shift of a received interrogating signal indicates that the range between interrogating and receiving aircraft is decreasing (the aircraft are moving closer together) and if a comparison of the altitudes of the interrogating and receiving aircraft indicates they are flying at approximately the same altitude within preestablished limits, then the threat evaluator and interrogator control circuit 20 will produce an output signal. This signal will be fed to the modulator circuit 26 to enable the receiving aircraft to transmit a modulated reply signal from which the interrogating aircraft can more precisely determine the threat of collision. The time of transmission of the reply signal is important to the operation of the subject asynchronous collision avoidance system as already indicated because it enables the interrogating aircraft to determine the future range between the aircraft involved. In the circuit shown in FIG. 1, the time of transmission of the reply is inversely delayed relative to some arbitrary time which corresponds to zero Doppler shift. The amount of this delay will be described for particular situations and can be varied depending on circumstances.

In FIG. 2 it is shown that the interrogation pulses 28 and 30 are received at the responding aircraft at some time after they are transmitted depending on the distance between the interrogating and receiving aircraft. This time is equal to $(R/C)$ where R is the range between the craft, and C is the well known propagation constant equal to the speed of light. If the two involved craft are staying approximately the same distance apart as indicated by a zero Doppler shift, then the receiving aircraft will transmit its reply signal at an arbitrary later time which is designated $T_w$ in FIG. 2 and is measured commencing with the leading edge of the received interrogation signal. However, when the Doppler shift sensed at a receiving aircraft indicates that the aircraft involved are moving closer to each other, the receiving craft will transmit its reply beginning at a time that is earlier than time $T_w$. The amount of this time difference is equal to twice the product of the range rate ($\dot{R}$) and an arbitrary warning time (T), which in the case of commercial aircraft as mentioned above is forty seconds divided by the propagation constant C. This relationship can be expressed by the equation $$T_{\text{early}} = 2\dot{R}T/C$$

It is important to bear in mind that this early time is measured from the arbitrary time $T_w$ at the receiving or responding aircraft and not at the interrogating aircraft. This permits the interrogating aircraft to setup a simple test for determining the range to the responding aircraft from the time of receipt of the reply signal and also provides a basis for evaluating the existance of a threat. This is true because any signal that arrives back at the interrogating craft before its own $T_w$ time or some other arbitrary time, for example twelve microseconds after $T_w$, which represents a two-way propagation time corresponding to a minimum range warning of approximately one mile, will automatically be considered to be a threat and will indicate that the replay signal has been sent by an aircraft within forty seconds or one mile to nearest approach.

The reply signal sent by the responding aircraft is preferably coded in some way such as in its shape or number of pulses to identify it to the interrogating aircraft. The reply pulses may also be modulated to instruct the interrogating craft to make a particular maneuver such as to climb or dive to escape the threatening condition. Referring to FIG. 2, if time at the interrogating aircraft is considered as the reference time, then all responses will arrive at the interrogating aircraft at time $T_A$, where $$T_A = T_w + \frac{2}{C}(R - \dot{R}t)$$

and a warning signal will be generated only when time $T_A$ occurs before time $T_w$ at the interrogating craft. If time $T_A$ occurs at or after time $T_w$ no warning response will be generated.

The arbitrary times and distances selected to distinguish between a dangerous and a non-dangerous condition can be varied substantially depending upon circumstances. For most commercial airlines a warning time of approximately forty seconds or a roundtrip transmission time of approximately twelve microseconds is a reasonable selection in most instances although this can be changed to meet different circumstances such as to satisfy faster flying craft as they are developed and put to use. Aircraft and space vehicles traveling at even much higher air speeds may require greater warning distances and warning times, and it is not intended to infer that one set of arbitrary limitations or standards will be suitable or practical under all conditions. The time duration of the interrogating and responding signal impulses can also be varied considerably as desired depending upon circumstances. For most situations involving aircraft an interrogation pulse duration of approximately 200 microseconds is long enough to provide accurate Doppler measurement and to identify and verify the accuracy of each received signal.

Also it is usually preferable to use the leading edges of the 200 microsecond pulses and of the other pulses as well to determine the pulse arrival time. This also avoids errors caused by ground and other signal reflections. Altitude is usually coded in a shorter duration pulse positioned to occur after the longer duration pulse used for determining range rate by a time which corresponds to the altitude of the aircraft as aforesaid.

All cooperating aircraft transmit and receive on the same frequency, and all aircraft transmit interrogating signals at periodic time intervals which need have no relationship to the transmission times in other aircraft. The receipt by an aircraft of an interrogating signal from another aircraft may also operate to delay transmission of the receiving crafts interrogating signal for a predetermined time to prevent the transmission of interferring signals. In this way, the subject system is kept random and interference is reduced to a minimum. The subject system may also include means to verify the validity of each signal received including means such as a ramp generator to determine the time duration and persistance of each signal before accepting it as valid and responding to it.

The form of the particular circuits and circuit elements included in the blocks of FIG. 1 may be of conventional construction using well known components and it is not intended to limit the circuits to specific forms. The main idea is to provide a relatively simple and inexpensive cooperating type collision avoidance system which does not depend on having all units being time synchronized. The subject asynchronous system is designed to provide collision avoidance protection for small inexpensive craft as well as for larger craft, and the present system is also designed to provide cooperative collision avoidance protection between the larger and smaller craft as well. To accomplish this and still provide more sophisticated protection for the larger commercial and military craft the present system can be installed as a backup or supplementary system to a large system. The present system is not, however, designed to completely replace the more sophisticated systems, and it is recognized that the more sophisticated systems have certain advantages and features that cannot be provided by the present system. For a description of such systems see Perkinson et al. Patent No. 3,250,896 and Perkinson et al. application Ser. No. 409,697, now Patent No. 3,341,812 which are assigned to applicants' assignee.

It should also be recognized that the present system has certain advantages over known systems including enabling a unique time to be setup for each individual airplane each time an interrogating signal is sent and these times are not dependent on time synchronization, and are not able to disturb previously established precise time since none exists in the present system. The simplicity and low cost of the present system are also important advantages which enable the system to be made available to a much greater market. The present system may also be constructed to make use of certain existing components in an aircraft including components of another system for which it serves as a backup.

Thus there has been shown and described a novel asynchronous collision avoidance system which fulfills all of the objects and advantages sought therefor. Many changes, modifications, variations, and other uses and applications of the subject system will, however, become apparent to those skilled in the art after considering this specification and the accompanying drawings. All such changes, modifications, variations and other uses and applications of the subject system which do not depart from the spirit and scope of the invention are deemed to be covered by the invention which is limited only by the claims which follow.

What is claimed is:

1. A collision warning system for aircraft and other relatively moving objects including a similar unit on each cooperating aircraft, each unit including transmitting and receiving means, means for generating signals of a predetermined frequency for transmitting from each aircraft, means for modulating each transmitted signal according to the altitude at the transmitting aircraft, means associated with the receiving means at each aircraft for comparing the altitude thereat with the altitude modulated into each signal received from another aircraft to ascertain if a substantially coaltitude condition exists, other means associated with the receiving means including means sensitive to the frequency of each signal received for determining the range rate of the transmitting and receiving aircraft, and means at the receiving aircraft including means responsive to the determined range rate for transmitting a reply signal back to the transmitting aircraft at a precise time relative to the time of receipt of the signal from the transmitting aircraft whenever a substantially coaltitude condition and a closing range rate condition exist simultaneously from which the transmitting aircraft can determine the range at some future time.

2. A collision avoidance system for aircraft and other relatively movable objects comprising means on each cooperating aircraft for periodically randomly transmitting interrogation signals coded to include information as to the altitude of the transmitting aircraft, said transmitting means in each aircraft including means for accurately controlling the transmitting frequency thereof so that all cooperating aircraft transmit at the same frequency, other means at each aircraft for receiving interrogation signals transmitted by other cooperating aircraft within range thereof, means connected to the receiving means in each aircraft including means for accurately measuring the frequency of each received interrogation signal to determine therefrom the rate and direction of relative movement between the transmitting and receiving aircraft, means at each receiving aircraft for decoding each received interrogation signal to determine the altitude of the transmitting aircraft, means for comparing the decoded altitude of the transmitting aircraft with the altitude at the receiving aircraft, other means at the receiving aircraft for energizing the transmitting means thereat to transmit a reply signal back to the transmitting aircraft whenever it is determined that the transmitting and receiving aircraft are flying at approximately the same altitude on courses that are bringing them closer together, said other means including means for advancing the time of transmission of said reply signal relative to a predetermined time after receipt of the signal from the transmitting aircraft by a factor proportional to the rate at which the aircraft are moving closer together, and means at the transmitting aircraft for receiving said reply signal and for determining from the time of its arrival the range at some predetermined future time between the interrogating and replying aircraft.

3. The collision avoidance system defined in claim 2 including means in each cooperating aircraft for distinguishing between threatening and non-threatening conditions.

4. The collision avoidance system defined in claim 3 wherein the means for distinguishing between threatening and non-threatening conditions includes means at each aircraft establishing an arbitrary time following transmission of an interrogation signal within which reply signals received from other aircraft representing a threat will be received.

5. The collision avoidance system defined in claim 2 including means at each aircraft for encoding reply signals transmitted thereby to indicate what maneuver the aircraft receiving said reply signals should make to avoid a threatening condition.

6. A warning system for use on aircraft and other relatively movable objects to prevent collisions therebetween comprising in each cooperating aircraft a similar collision warning device, each such device including signal general means and means for periodically transmitting interrogating signals at a predetermined frequency, means responsive to the altitude at the transmitting aircraft for modulating the transmitted outputs of said signal generating means according to the altitude thereat, other means in each collision warning device for receiving altitude modulated interrogating signals transmitted by other cooperating aircraft within radio range thereof, said receiving means including means for demodulating said interrogating signals to determine the altitude of the transmitting aircraft, means for comparing the altitude of the transmitting and receiving aircraft, other means at each receiving aircraft responsive to the frequency of the received signals for determining therefrom the range rate therebetween, and means at the receiving aircraft for transmitting a reply signal back to the transmitting aircraft whenever a substantially coaltitude condition and a closing range rate condition simultaneously are determined, said reply signal being transmitted earlier than a precise time relative to the time of receipt of the interrogating signal by a factor proportional to the range rate therebetween so that the time of arrival of the reply signal at the transmitting aircraft can be used to determine a future range between the aircraft.

7. The warning system defined in claim 6 wherein each collision warning device includes means for verifying that a received interrogating signal is valid 8. The warning system defined in claim 6 wherein each collision warning device includes means to modulate a reply signal to include information as to what maneuver the transmitting aircraft should make to avoid a threatening condition.

9. The warning system defined in claim 6 wherein each aircraft includes means establishing minimum arbitrary range and altitude conditions required to represent a threat.

10. The warning system defined in claim 6 wherein each transmitted interrogation signal includes a first signal pulse of predetermined time duration from which to measure range rate and a second signal pulse spaced from the first signal pulse by a time duration that is proportional to the altitude of the transmitting aircraft.

11. A collision warning system for aircraft and other relatively moving objects including a similar unit on each cooperating aircraft, each unit including transmitting and receiving means, means for generating signals of a predetermined frequency for transmitting from each aircraft, means for modulating each transmitted signal according to the altitude at the transmitting aircraft, means associated with the receiving means at each aircraft for comparing the altitude thereat with the altitude modulated into each signal received from another aircraft to ascertain if a substantially coaltitude condition exists, other means associated with the receiving means including means sensitive to the frequency of each signal received for determining the range rate of the transmitting and receiving aircraft, means at the receiving aircraft for transmitting a reply signal back to the transmitting aircraft whenever a substantially coaltitude condition and a closing range rate condition simultaneously exist, said receiving aircraft including means for advancing the time of transmission of the reply signal relative to a fixed time following receipt of the signal from the transmitting aircraft by a factor proportional to the closing range rate between the craft so that the time of arrival of the reply signal at the transmitting aircraft will represent an estimate of the range at a future time between the aircraft from which the transmitting aircraft can determine if a threat exists.

12. A collision avoidance system for aircraft and other relatively movable objects comprising means on each cooperating aircraft for periodically randomly transmitting interrogation signals at some predetermined frequency coded to include information as to the altitude of the transmitting aircraft, other means at each aircraft for receiving similar interrogation signals transmitted by other cooperating aircraft within range thereof, means connected to the receiver means in each aircraft including means for accurately measuring the frequency of each received interrogation signal to determine therefrom by Doppler measurement the range rate which includes the rate and direction of relative movement between the transmitting and receiving aircraft, means at each receiving aircraft for decoding each received interrogation signal to determine the altitude of the transmitting aircraft, means for comparing the decoded altitude of the transmitting aircraft with the altitude at the receiving aircraft, means at the receiving aircraft for energizing the transmitting means thereat to transmit a reply signal back to the transmitting aircraft under predetermined conditions, a reply signal being transmitted whenever it is determined at the receiving aircraft that the transmitting and receiving aircraft are flying at approximately the same altitude and are on courses that are bringing them closer together, said receiving aircraft including means responsive to the Doppler measurement for controlling the time of transmission of the reply signal, and means at the transmitting aircraft for receiving said reply signal and for determining from the time of its arrival the estimated range at a future time between the said aircraft.

References Cited

UNITED STATES PATENTS

| | | |
|---|---|---|
| 2,090,359 | 8/1937 | Robinson. |
| 3,035,260 | 5/1962 | Freedman et al. _____ 343—6.5 |
| 3,046,548 | 7/1962 | Briskin. |
| 3,167,772 | 1/1965 | Bagnall et al. _____ 343—6.5 X |
| 3,208,064 | 9/1965 | Morrel. |
| 3,341,812 | 9/1967 | Perkinson et al. ____ 343—6.5 X |

RICHARD A. FARLEY, Primary Examiner

M. F. HUBLER, Assistant Examiner

U.S. Cl. X.R.

343—6.8

UNITED STATES PATENT OFFICE
CERTIFICATE OF CORRECTION

Patent No. 3,456,256                            July 15, 1969

Robert E. Perkinson et al.

It is certified that error appears in the above identified patent and that said Letters Patent are hereby corrected as shown below:

Column 1, line 65, "thread" should read -- threat --. Column 2, line 56, "sophisticate" should read -- sophisticated --; line 69, after "range" insert -- rate --. Column 4, line 6, "Droppler" should read -- Doppler --. Column 5, line 17, "$T_{early}=2\bar{R}T/C$" should read -- $T_{early}=2\dot{R}T/C$ --; line 32, "replay" should read -- reply --. Column 7, line 69, "general" should read -- generating --.

Signed and sealed this 21st day of April 1970.

(SEAL)
Attest:

Edward M. Fletcher, Jr.                        WILLIAM E. SCHUYLER, JR.
Attesting Officer                                         Commissioner of Patents